(12) United States Patent
Zaugg et al.

(10) Patent No.: US 12,242,107 B2
(45) Date of Patent: Mar. 4, 2025

(54) OPTOFLUIDIC DEVICES

(71) Applicant: Fluxus, Inc., Sunnyvale, CA (US)

(72) Inventors: Frank Zaugg, Redwood City, CA (US); Joshua Wayne Parks, Portland, OR (US)

(73) Assignee: Fluxus, Inc., Santa Clara, CA (US)

(*) Notice: Subject to any disclaimer, the term of this patent is extended or adjusted under 35 U.S.C. 154(b) by 237 days.

(21) Appl. No.: 17/962,204

(22) Filed: Oct. 7, 2022

(65) Prior Publication Data

US 2024/0118490 A1     Apr. 11, 2024

(51) Int. Cl.
| | |
|---|---|
| G02B 6/122 | (2006.01) |
| G02B 6/136 | (2006.01) |
| B01L 3/00 | (2006.01) |
| G02B 6/12 | (2006.01) |

(52) U.S. Cl.
CPC ............ G02B 6/122 (2013.01); G02B 6/136 (2013.01); *B01L 3/502715* (2013.01); *G02B 2006/12035* (2013.01); *G02B 2006/121* (2013.01); *G02B 2006/12176* (2013.01)

(58) Field of Classification Search
None
See application file for complete search history.

(56) References Cited

U.S. PATENT DOCUMENTS

| | | | | |
|---|---|---|---|---|
| 6,063,299 A | * | 5/2000 | Drake | ............... G02B 6/136 216/2 |
| 6,253,015 B1 | | 6/2001 | Ukrainczyk | |
| 6,438,279 B1 | * | 8/2002 | Craighead | ............... G02B 6/10 385/12 |
| 6,946,238 B2 | | 9/2005 | Zhang et al. | |
| 9,551,650 B2 | | 1/2017 | Nitkowski et al. | |
| 9,835,801 B1 | | 12/2017 | Qian et al. | |

(Continued)

FOREIGN PATENT DOCUMENTS

| | | |
|---|---|---|
| CN | 1729415 A | 1/2006 |
| JP | 2004-512551 A | 4/2004 |

(Continued)

OTHER PUBLICATIONS

Notice of Reason for Rejection mailed Feb. 7, 2023, directed to JP Application No. 2021-516527; 12 pages.

(Continued)

*Primary Examiner* — Jerry Rahll
(74) *Attorney, Agent, or Firm* — Morrison & Foerster LLP

(57) ABSTRACT

Disclosed herein are waveguiding structures and methods of manufacturing waveguiding structures, a waveguiding structure comprising: a waveguiding layer comprising a first oxide layer, a second oxide layer adjacent to the first oxide layer, a third oxide layer adjacent to the second oxide layer on a side opposite from the first oxide layer, and an oxide strip adjacent to the second oxide layer and extending at least partially into the third oxide layer, wherein the first, second, and third oxide layer and oxide strip form a ridge waveguide; a fluid channel extending through at least a portion of the first, second, and third oxide layers and intersecting the ridge waveguide such that light carried by the ridge waveguide is incident on the fluid channel; and a cover layer affixed to the waveguiding layer and enclosing the fluid channel.

40 Claims, 5 Drawing Sheets

(56) References Cited

U.S. PATENT DOCUMENTS

| | | |
|---|---|---|
| 2003/0006140 A1 | 1/2003 | Vacca et al. |
| 2003/0012483 A1 | 1/2003 | Ticknor et al. |
| 2003/0117699 A1 | 6/2003 | Maroney et al. |
| 2003/0219192 A1 | 11/2003 | Crafts et al. |
| 2012/0293797 A1 | 11/2012 | Braeckmans et al. |
| 2013/0223790 A1 | 8/2013 | Jones et al. |
| 2013/0244227 A1 | 9/2013 | Schmidt et al. |
| 2015/0093816 A1 | 4/2015 | Agae et al. |
| 2016/0003730 A1 | 1/2016 | Schreuder et al. |
| 2017/0205351 A1 | 7/2017 | Astier et al. |
| 2018/0081207 A1 | 3/2018 | Qian et al. |
| 2020/0200972 A1* | 6/2020 | Steglich ............. G01N 15/1484 |
| 2021/0181415 A1* | 6/2021 | Zaugg ................ G01N 21/0303 |
| 2023/0221491 A1 | 7/2023 | Zaugg et al. |
| 2024/0118490 A1* | 4/2024 | Zaugg .............. B01L 3/502707 |

FOREIGN PATENT DOCUMENTS

| | | |
|---|---|---|
| JP | 2014-504154 A | 12/2014 |
| WO | 02/33457 A2 | 4/2002 |
| WO | 2004/040319 A1 | 5/2004 |
| WO | 2011/073410 A1 | 6/2011 |
| WO | 2012/068511 A2 | 5/2012 |
| WO | 2019/226679 A1 | 11/2019 |

OTHER PUBLICATIONS

Office Action dated Jan. 13, 2023, directed to CN Application No. 201980033689.9; 9 pages.

Notice of Reasons for Rejection dated Mar. 26, 2024, directed to JP Application No. 2021-516527; 9 pages.

Office Action dated Jan. 15, 2024, directed to EP Application No. 19806437.0; 8 pages.

Office Action dated May 15, 2024, directed to CA Application No. 3,098,629; 5 pages.

Zaugg et al., U.S. Notice of Allowance dated Aug. 11, 2023, directed to U.S. Appl. No. 17/970,804; 9 pages.

International Search Report and Written Opinion mailed May 23, 2023, directed to International Application No. PCT/US2022/077814; 17 pages.

Notice of Reasons for Rejection dated Oct. 17, 2023, directed to JP Application No. 2021-516527; 11 pages.

Chen et al. (2006). "Development of ion-implanted optical waveguides in optical materials: A review," Optical Materials 29; 1523-1542.

Extended European Search Report dated Jan. 28, 2022, directed to EP Application No. 19806437.0; 8 pages.

International Preliminary Report on Patentability mailed Dec. 3, 2020, directed to International Application No. PCT/US2019/033365; 8 pages.

International Search Report and Written Opinion mailed Aug. 9, 2019, directed to International Application No. PCT/US2019/33365; 10 pages.

Messaddeq (Spring 2015). "Glass Processing," Lehigh Lecture 19 Introduction to Dielectric Waveguide; 68 pages.

Notification of the First Office Action dated Jul. 15, 2022, directed to CN Application No. 201980033689.9; 16 pages.

Office Action dated Sep. 9, 2022, directed to IN Application No. 202017051590; 6 pages.

Pena-Rodriguez et al. (2012). "Optical Waveguides Fabricated by Ion Implantation/Irradiation: A Review," Ion Implantation; 48 pages.

Righini et al. (Jul. 2014). "Glass optical waveguides: a review of fabrication techniques," Optical Engineering 53(7); 15 pages.

Song et al., (1999). "Micromachined Silicon Optical Bench for the Low Cost Optical Module," LG Corporate Institute of Technology; 9 pages.

Zaugg et al., U.S. Office Action dated Jan. 6, 2022, directed to U.S. Appl. No. 17/057,508; 14 pages.

Zhao et al., (2012). "Optimization of Interface Transmission Between Integrated Solid Core and Optofluidic Waveguides," IEEE Photonics Tech. Letters 24: 1, pp. 46-48.

Office Action dated Jul. 9, 2024, directed to KR Application No. 10-2020-7036889; 13 pages.

\* cited by examiner

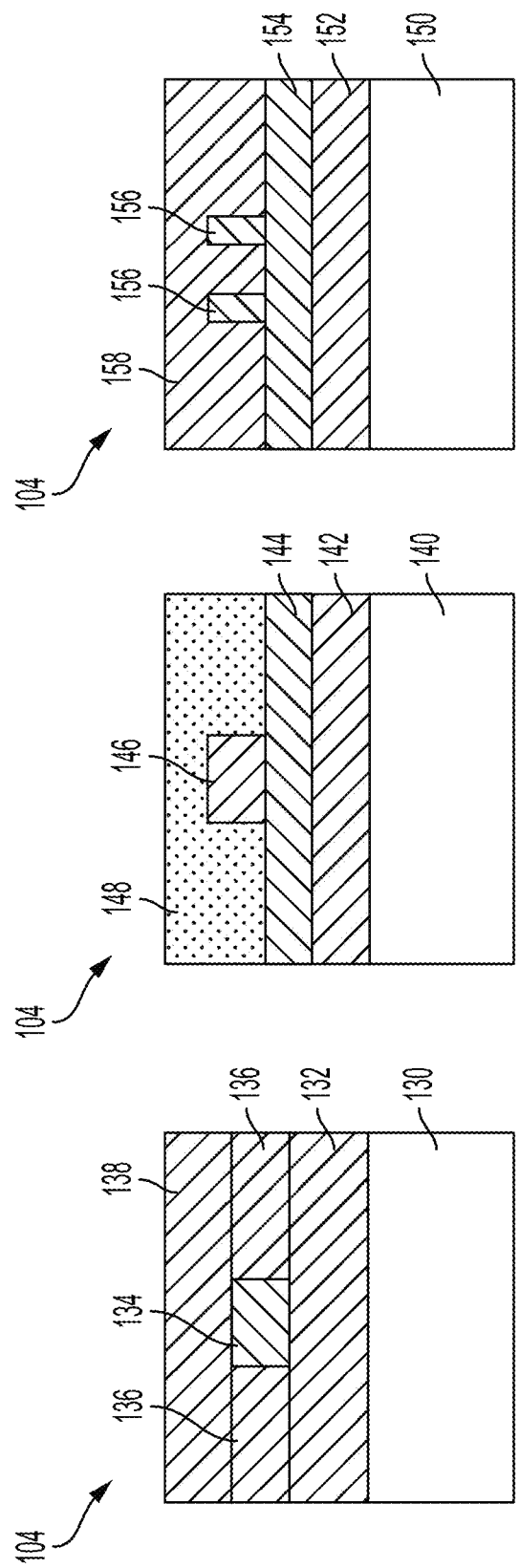

OPTOFLUIDIC DEVICES

FIELD

The present disclosure relates generally to waveguide architectures, and more specifically to two-dimensional waveguide structures including optofluidic chips having optical waveguides fabricated without the use (or with minimized use) of airgaps.

BACKGROUND

Waveguide structures such as optical chips and optofluidic chips are critical in modern biomedical research. For example, optical chips and optofluidic chips (e.g., lab-on-chip devices) have applications in biochemical analysis, treatment, and point-of-care (POC) diagnostic devices. Lab-on-chip devices have been found to enhance the ability to detect micro-particles in an integrated system and without the use of external bulky optics. These waveguide structures may comprise solid-core waveguides, fluidic channels, and/or fluid-core waveguides, which may be disposed in the same plane as one another and may intersect one another in various configurations.

Known techniques for fabricating said structures require multiple fabrication steps. For example, known techniques for fabrication of waveguide chips may include six or more lithography steps, multiple etching steps, multiple deposition steps, and a sacrificial core removal process. Furthermore, known techniques for fabricating waveguide structures may include fabricating optical waveguides by etching (or otherwise forming) airgaps that surround a waveguide core. Differences in index of refraction for the material forming a waveguide core as compared to the surrounding air in an airgap cause light to be guided through the waveguide.

SUMMARY

As described above, recent developments in the field of optofluidics have provided advancements in biomedical research by integrating optofluidic components into miniaturized systems and realizing the high level of tuneability possessed by reconfigurable optofluidic components, resulting in highly adaptive and simplified waveguide architectures. Despite these advancements, however, the predictability of properties of light in waveguide structures remains uncertain, thus hindering the application of waveguide structures in analytics and diagnostics. For example, prior studies have shown difficulties in focusing light beams (especially those with high numerical apertures) using optofluidic components, at least because structural materials of waveguide structures often have very high indices of refraction (e.g., between 1.3 and 1.6). Moreover, known techniques for fabricating waveguide structures such as optical chips and optofluidic chips require a multitude of steps, which also hinders the application of optofluidic chips. The fabrication steps are difficult, complex, time-consuming, and expensive to perform. For example, waveguide structures, as mentioned above, often require etching airgaps into the waveguide structure surrounding a core of the waveguide. Additionally, alignment steps in fabricating optofluidic chips introduce various opportunities for imperfections and flaws in waveguide structures due to the potential for misalignment in the miniaturized systems.

Airgaps have historically been a key component in waveguide structures because they contribute to propagating light through the waveguide (e.g., due at least in part to the difference in refraction between air and solid components of the waveguide adjacent to the airgaps). Nonetheless, airgaps produce challenges in using optofluidic chips because they cause light leakages between proximally attached fluidic layers during use. Furthermore, etching depressions in waveguide structures, such as airgaps, diminishes the bondability and/or attachability of fluidic layers in the waveguide chip.

Thus, there is a need in fields leveraging waveguide structures such as optical chips and optofluidic chips to develop simple, optimized waveguide architectures that limit light leakage as light propagates through the waveguide structure and improve predictability (e.g., reproducibility) of the systems. Furthermore, there is a need to reduce the number of steps and processes for fabricating said optimized chips and structures in order to improve general manufacturability, cost, yield, and reproducibility.

Disclosed herein are improved techniques and structures that may address one or more of the above needs. The waveguide structures provided herein may reduce light leakages between proximally attached fluidic layers by removing air gaps from waveguide architectures. In some embodiments, the waveguide structures may improve predictability and reproducibility of light traveling through optofluidic chips by introducing a buried waveguide structure that may comprise an oxide strip disposed within an oxide layer of the waveguiding structure, the oxide layer and oxide strip having distinct indices of refraction. The buried waveguide structures may produce single-mode waveguides that comprise a more reproducible and predictable light intensity cross-section. Additionally, the non-airgap waveguide structures disclosed herein may be disposed adjacent to (e.g., at the edge of) the fluidic channel. By disposing the non-airgap waveguide structures in close proximity to the fluidic channel, the predictability of light within the channel may be improved.

In some embodiments, as described herein, a simple lithography/etching process followed by a bonding process may replace the unwieldy and expansive series of steps required by previous techniques. The reduction in the overall number of steps may allow for faster, more efficient, less complex, and less expensive production (e.g., manufacturability, cost, yield, reproducibility), including at a commercial scale. The techniques described herein may require fewer microfabrication steps than known methods, may allow direct fluidic integration (e.g., a planar chip surface may enable bonding techniques as well as simpler fluidic interconnects), may eliminate the requirement for time-consuming etching steps, and may enable choosing between more varied materials than only those materials that are compatible with traditional methods.

Additionally, the fabrication of optical waveguide structures without the use of airgaps (e.g., formed by etching) surrounding the waveguide core may simplify fabrication and improve bondability and attachability between fluidic layers. Furthermore, removing airgaps may allow for waveguide structure components, such as cover layers, to be effectively and easily attached to (e.g., bonded to) a uniform surface of a waveguiding layer of the structure. For example, a top surface of a waveguiding layer formed of multiple oxide layers may be a uniform flat surface that is not interrupted by any airgaps etched into the waveguiding layer, and a cover layer may therefore be easily and effectively bonded to the flat top surface without concern that the airgaps will compromise the integrity of the bond or that an adhesive or other foreign objects will compromise the optical properties of the waveguide by entering the airgaps.

In some embodiments, a waveguiding structure is provided, the waveguiding structure comprising: a waveguiding layer comprising a first oxide layer, a second oxide layer adjacent to the first oxide layer, a third oxide layer adjacent to the second oxide layer on a side opposite from the first oxide layer, and an oxide strip adjacent to the second oxide layer and extending at least partially into the third oxide layer, wherein the first, second, and third oxide layer and oxide strip form a ridge waveguide; a fluid channel extending through at least a portion of the first, second, and third oxide layers and the oxide strip and intersecting the ridge waveguide such that light carried by the ridge waveguide is incident on the fluid channel; and a cover layer affixed to the waveguiding layer and enclosing the fluid channel.

In some embodiments, the second oxide layer and the oxide strip each have a first index of refraction.

In some embodiments, the first and third oxide layer each have a second index of refraction lower than the first index of refraction.

In some embodiments, the waveguiding structure comprises an aperture layer adjacent to the waveguiding layer.

In some embodiments, the aperture layer comprises chrome, nickel, another metal, and/or one or more anti-resonant reflecting optical waveguide (ARROW) layers.

In some embodiments, the aperture layer is configured to allow light to pass through one or more apertures in the aperture layer, wherein the one or more apertures are aligned with the fluid channel.

In some embodiments, the waveguiding structure comprises a substrate layer adjacent to the aperture layer and opposite the waveguiding layer.

In some embodiments, the substrate layer comprises one or more materials selected from the group: silicon, silica, and glass.

In some embodiments, the substrate layer comprises an etched region aligned with one or more apertures of the aperture layer.

In some embodiments, the substrate layer comprises an oxide sealing layer.

In some embodiments, the etched region comprises a lens element configured to collect light that escapes from the fluid channel into the etched region.

In some embodiments, the cover layer is affixed to the waveguiding layer at a location adjacent to the ridge waveguide.

In some embodiments, the cover layer comprises one or more apertures aligned with the fluid channel.

In some embodiments, a waveguiding structure is provided, the waveguiding structure comprising: a waveguiding layer comprising a first oxide layer, a second oxide layer adjacent to the first oxide layer, a third oxide layer adjacent to the second oxide layer on a side opposite from the first oxide layer, and an oxide strip disposed in the second oxide layer, wherein the first, second, and third oxide layer and oxide strip form a buried waveguide; a fluid channel extending through at least a portion of the first, second, and third oxide layers and the oxide strip and intersecting the buried waveguide such that light carried by the buried waveguide is incident on the fluid channel; and a cover layer affixed to the waveguiding layer and enclosing the fluid channel.

In some embodiments, the first, second, and third oxide layer each have a first index of refraction.

In some embodiments, the oxide strip has a second index of refraction higher than the first index of refraction.

In some embodiments, the cover layer is affixed to the waveguiding layer at a location adjacent to the buried waveguide.

In some embodiments, a waveguiding structure is provided, the waveguiding structure comprising: a waveguiding layer comprising a first oxide layer, a second oxide layer adjacent to the first oxide layer, a third oxide layer adjacent to the second oxide layer on a side opposite from the first oxide layer, and an oxide strip adjacent to the second oxide layer and extending at least partially into the third oxide layer, wherein the first, second, and third oxide layer and oxide strip form a strip-loaded waveguide; a fluid channel extending through at least a portion of the first, second, and third oxide layers and the oxide strip and intersecting the strip-loaded waveguide such that light carried by the strip-loaded waveguide is incident on the fluid channel; and a cover layer affixed to the waveguiding layer and enclosing the fluid channel.

In some embodiments, the first oxide layer and the oxide strip each have a first index of refraction.

In some embodiments, the second oxide layer has a second index of refraction higher than the first index of refraction.

In some embodiments, the third oxide layer has a third index of refraction higher than the first index of refraction and lower than the second index of refraction.

In some embodiments, the first oxide layer has a first index of refraction.

In some embodiments, the oxide strip has a second index of refraction different from the first index of refraction.

In some embodiments, the cover layer is affixed to the waveguiding layer at a location adjacent to the strip-loaded waveguide.

In some embodiments, a waveguiding structure is provided, the waveguiding structure comprising: a waveguiding layer comprising a first oxide layer, a second oxide layer adjacent to the first oxide layer, a third oxide layer adjacent to the second oxide layer on a side opposite from the first oxide layer, and at least two oxide ribs disposed adjacent to the second oxide layer and extending at least partially into the third oxide layer, wherein the first, second, and third oxide layer and the at least two oxide ribs form a slot waveguide between the at least two oxide ribs; a fluid channel extending through at least a portion of the first, second, and third oxide layers and the at least two oxide ribs and intersecting the slot waveguide such that light carried by the slot waveguide is incident on the fluid channel; and a cover layer affixed to the waveguiding layer and enclosing the fluid channel.

In some embodiments, the first and third oxide layer each have a first index of refraction.

In some embodiments, the second oxide layer and the at least two oxide ribs each have a second index of refraction higher than the first index of refraction.

In some embodiments, the cover layer is affixed to the waveguiding layer at a location adjacent to the slot waveguide.

In some embodiments, a waveguiding structure is provided, the waveguiding structure comprising: a waveguiding layer comprising a waveguide; a fluid reservoir extending through at least a portion of the waveguiding layer and intersecting the waveguide such that light carried by the waveguide is incident on the fluid reservoir, wherein the fluid reservoir comprises an imaging region and a non-imaging region.

In some embodiments, the waveguiding structure comprises an aperture layer adjacent to the waveguiding layer, wherein the aperture layer comprises a light-blocking region disposed adjacent to the non-imaging region in the fluid reservoir and comprises one or more apertures disposed adjacent to the imaging region in the fluid reservoir.

In some embodiments, the waveguiding layer comprises a plurality of oxide layers.

In some embodiments, the fluid reservoir extends through at least a portion of one or more of the plurality of oxide layers of the waveguiding layer.

In some embodiments, the waveguiding structure comprises at least one device, configured to create turbulence for inducing flow in the fluid reservoir between the non-imaging region and the imaging region, selected from the following set: an agitation device, a stirrer, a mixer, a pump, and a sonicator.

In some embodiments, the waveguiding structure comprises a substrate layer on a side of the aperture layer opposite the waveguiding layer.

In some embodiments, the waveguiding structure comprises a sensor configured to capture image data of particles in suspension in the imaging region of the reservoir when the particles are illuminated or excited by the light carried by the waveguide.

In some embodiments, the waveguiding structure comprises an oxide strip disposed in the waveguiding layer, the oxide strip having a first index of refraction.

In some embodiments, at least a portion of the waveguiding layer has a second index of refraction different from the first index of refraction.

In some embodiments, the fluid reservoir extends through at least a portion of the oxide strip disposed in the waveguiding layer.

In some embodiments, the waveguiding structure comprises at least two oxide ribs disposed in the waveguiding layer, the at least two oxide ribs having a first index of refraction.

In some embodiments, at least a portion of the waveguiding layer has a second index of refraction different from the first index of refraction.

In some embodiments, the fluid reservoir extends through at least a portion of the at least two of oxide ribs disposed in the waveguiding layer.

In some embodiments, a method of manufacturing a waveguiding structure, is provided, the method comprising: disposing a waveguiding layer adjacent to a substrate layer, the waveguiding layer comprising one or more oxide layers forming a waveguide, the waveguiding layer having a planar top surface; etching a fluid channel into the waveguiding layer by etching through a portion of the planar top surface of the waveguiding layer, the fluid channel intersecting at least one of the one or more oxide layers of the waveguiding layer; and disposing a cover layer adjacent to the waveguiding layer, such that the cover layer covers the etched fluid channel and is affixed to the waveguiding layer at a location adjacent to the waveguide.

BRIEF DESCRIPTION OF THE FIGURES

The invention will now be described, by way of example only, with reference to the accompanying drawings, in which:

FIGS. 1A-1E depict schematic views of a waveguide structure, in accordance with some embodiments.

DETAILED DESCRIPTION

Figure 1A:
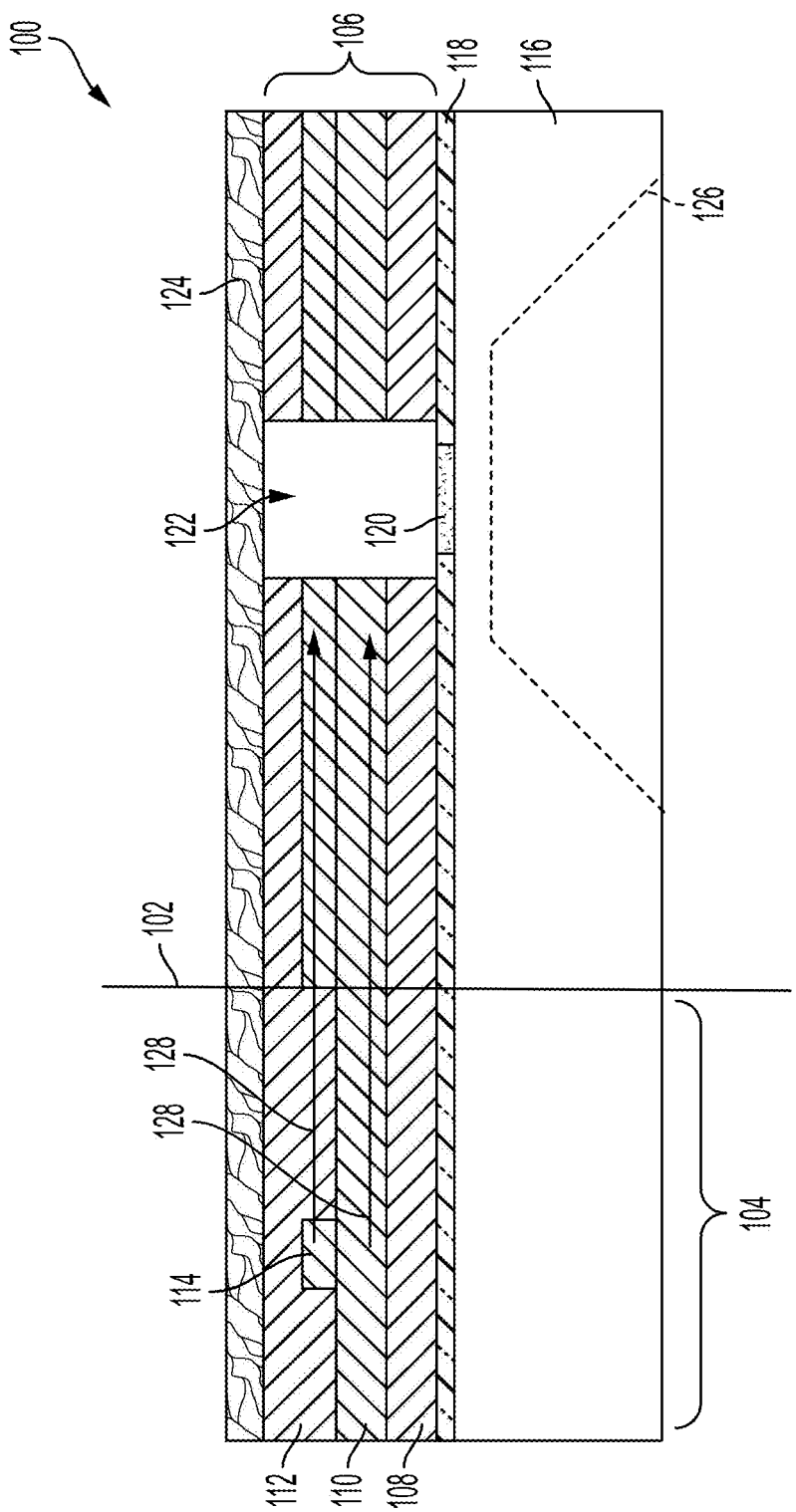

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The waveguide structures provided herein may reduce light leakages between proximally attached fluidic layers by removing air gaps from waveguide architectures. The non-airgap waveguide structures and fabrication methods may improve predictability and reproducibility of light traveling through optofluidic chips and reduce the number of steps previously required of manufacturing waveguide architectures. In some embodiments, the disclosed waveguide structures may comprise a buried waveguide structure with an oxide strip disposed within an oxide layer of the waveguiding structure, the oxide layer and oxide strip having distinct indices of refraction. The buried waveguide structures may produce single-mode waveguides that comprise a more reproducible and predictable light intensity cross-section.

Additionally, the non-airgap waveguide structures disclosed herein may be disposed at the edge of the fluidic channel. By disposing the non-airgap waveguide structures adjacent to the fluidic channel, the predictability of light within the channel may be improved.

In some embodiments, as described herein, the fabrication of the optofluidic chips described herein may require a simple lithography/etching process followed by a bonding process, rather than the unwieldy and expansive series of steps required by previous techniques. For example, a waveguide structure (e.g., a two-dimensional waveguide structure) may be formed from a chip comprising a substrate layer and a waveguiding layer on top of the substrate layer. In some embodiments, the substrate layer may be formed of silicon, silica, glass, polymers or other suitable materials and the waveguiding layer may be formed of one or more oxides, such as silicon oxides, plasma enhanced chemical vapor deposition (PECVD) oxides, low temperature oxide, phosphorous doped oxide, silicon oxynitride, or other suitable materials. The waveguiding layer may in some embodiments be greater than or equal to 1 µm, 5 µm, 10 µm, or 20 µm thick. The waveguiding layer may in some embodiments be less than or equal to 1 µm, 5 µm, 10 µm, or 20 µm thick. The material(s) used in the waveguiding layer may be selected such that the material effectively transmits light and may form both the solid core of a solid-core waveguide and the walls of a fluid channel/reservoir and/or the walls of a fluid-core waveguide. The waveguiding layer may include an optical waveguide including, for example, a ridge waveguide, a buried waveguide, a strip-loaded waveguide, and/or a slot waveguide, for example, each of which are described in further detail with reference to FIGS. 1A-1E herein. The waveguiding layer disclosed herein may comprise a waveguide comprising a waveguide core region, cladding region, and a surrounding (e.g., boundary) region disposed within the optical waveguide structures.

After the waveguiding layer is disposed (e.g., placed or deposited) on the substrate layer, one or more etching steps may be performed in order to form one or more fluid channels and/or fluid reservoirs (which may in some embodiments also be fluid-core waveguides). To form a fluid channel and/or fluid reservoir, a cavity of the fluid channel or reservoir may be etched out of the waveguiding layer.

In some embodiments, the dimensions of the fluid channel and/or fluid reservoir may be varied to affect the flow speed of a fluid through the fluid channel and/or fluid reservoir. In some embodiments, flow of fluid through the fluid channel and/or fluid reservoir may be caused by one or more of vacuum, positive pressure, an agitation device, stirrer or pump, electroosmosis, and/or electrophoresis. In some embodiments, analytes within the fluid may also reach the detection zone of the chip passively (e.g., by diffusion) for measurement. In some embodiments, geometries of the fluid channel may be formed to cause flow focusing via sheath flow. In some embodiments, a height and/or width of a fluid channel may be less than or equal to 0.25 µm, 0.5 µm, 1 µm, 5 µm, 10 µm, 25 µm, 50 µm, 100 µm, 250 µm, 500 µm, or 1000 µm. In some embodiments, a height and/or width of a fluid channel may be greater than or equal to 0.25 µm, 0.5 µm, 1 µm, 5 µm, 10 µm, 25 µm, 50 µm, 100 µm, 250 µm, 500 µm, or 1000 µm. In some embodiments, a flow speed through a fluid channel may be less than or equal to 0.005 µL/min, 0.01 µL/min, 0.1 µL/min, 1 µL/min, 10 µL/min, 100 µL/min, or 500 µL/min. In some embodiments, a flow speed through a fluid channel may be greater than or equal to 0.005 µL/min, 0.01 µL/min, 0.1 µL/min, 1 µL/min, 10 µL/min, 100 µL/min, or 500 µL/min.

In some embodiments, a waveguide structure may comprise a fluid reservoir, which may remain open on at least one side (e.g., a top side) when in use. In some embodiments, the fluid reservoir may be at least partially enclosed by a cover layer adjacent to (e.g., on top of) the fluid reservoir, as described in greater detail below. In some embodiments, a fluid channel may be configured for flow of fluid in a primary flow direction along a length of the channel, whereas fluid in a fluid reservoir may not flow in a single primary direction and/or may not flow at all. In some embodiments, dimensions of a fluid reservoir may be significantly larger, e.g., in a lateral direction, than dimensions of a fluid channel. For example, the fluid reservoir may be greater than or equal to 2, 3, 4, or 5 magnitudes wider than a fluid channel of a waveguide structure as described above. In some embodiments, the fluid reservoir may be less than or equal to 2, 3, 4, or 5 magnitudes wider than a fluid channel of a waveguide structure. In some embodiments, a height and/or width of a fluid reservoir may be between 100 µm and 10 mm. In some embodiments, a height and/or width of a fluid reservoir may be greater than or equal to 50 µm, 75 µm, 100 µm, 125 µm, or 150 µm. In some embodiments, a height and/or width of a fluid reservoir may be less than or equal to 5 mm, 7.5 mm, 10 mm, 12.5 mm, or 15 mm. In some embodiments, a flow speed in a fluid reservoir may be between 0.1 mm/sec and 1000 mm/sec. In some embodiments, a flow speed in a fluid reservoir may be greater than or equal to 0.05 mm/sec, 0.075 mm/sec, 0.1 mm/sec, 0.3 mm/sec, or 0.5 mm/sec. In some embodiments, a flow speed in a fluid reservoir may be less than or equal to 500 mm/sec, 750 mm/sec, 1000 mm/sec, 1250 mm/sec, or 1500 mm/sec.

In some embodiments, the fluid channel/reservoir etching steps may comprise dry etching such as reactive-ion etching, deep reactive ion etching, and/or neutral loop discharge etching; in some embodiments, the etching steps may comprise wet etching such as etching with buffered hydrofluoric acid. In some embodiments, the etching process may also comprise etching a region at an end of a solid-core waveguide, thereby forming an end of the optical waveguide (e.g., an optical facet) into which light may be coupled.

After forming the waveguiding layer to include an optical waveguide and after etching the waveguiding layer to form the fluid channel and/or fluid reservoir, a cover layer may be applied to the top of at least a portion of the waveguiding layer to enclose the open side of the fluid channel/reservoir. In some embodiments, the cover layer may completely cover the waveguiding layer, waveguide therein, and/or waveguide core therein. In some embodiments, the cover layer may be bonded to a uniform surface of the waveguiding layer, and the cover layer may be attached to the uniform surface of the waveguiding layer without the need to work around or to enclose any airgaps etched in the waveguiding layer. For example, the cover layer may be applied to a uniform upper (e.g., top) surface of the waveguiding layer comprising a waveguide comprising a waveguide core. Affixing the cover layer to a waveguiding layer that is formed without any airgaps may be advantageous because it increases the area of the bond (thereby increasing bond strength), simplifies the attachment process, and obviates the need to prevent adhesives or other foreign objects from being trapped inside the airgaps.

In some embodiments, the cover layer may be affixed to the waveguide structure at least where the waveguiding layer intersects the fluid channel/reservoir. In some embodiments, the cover layer may comprise a recessed portion (e.g., disposed at least adjacent to, or above, the fluid channel/reservoir), such that the height of the fluid channel/reservoir may extend into a portion of the cover layer thickness. In some embodiments, the cover layer may comprise polymers, silicones (e.g., polydimethylsiloxane, PDMS), pressure-sensitive adhesive layers, bonded glass, ARROW layers, total-internal-reflection-coated (e.g., low refractive index materials such as TEFLON AF), or metal-coated materials. In some embodiments, the cover layer may be less than or equal to 1 µm, 5 µm, 10 µm, 50 µm, 100 µm, 150 µm, or 200 µm, 300 µm, 1 mm, 5 mm or 10 mm thick. In some embodiments, the cover layer may be greater than or equal to 1 µm, 5 µm, or 10 µm, 50 µm, 100 µm, 150 µm, or 200 µm, 300 µm, 1 mm, 5 mm or 10 mm thick. In some embodiments, the cover layer may be affixed to the waveguiding layer by permanent or impermanent bonding, adhesive gluing, stiction, adhesive tapes, laser bonding or other suitable means. For example, the top surface of the waveguiding structure may be flat to accommodate sealing the fluid channel/reservoir via bonding and/or PDMS.

After the etching and attachment of the cover layer is complete, the fluid channel and/or reservoir may be filled with fluid, such as a gas or liquid containing analytes to be excited by excitation light that propagates along the solid-core waveguide and is incident upon the fluid channel. In some embodiments, emission from analytes in the fluid channel (or reservoir) may be collected out-of-plane (e.g., by overhead or underneath photodetectors) or in-plane (e.g., by being guided to an in-plane photodetector by the fluid channel when the fluid channel is a fluid-core waveguide or by capture of said emission by a solid-core waveguide structure without the use of a fluid-core waveguide).

In some embodiments, performance of the fluid channel as a fluid-core waveguide (e.g., for in-plane detection of emission light) may be increased by reducing cladding material average refractive index or by etching out some of the substrate layer beneath the channel, as discussed further below.

Figure 1B:
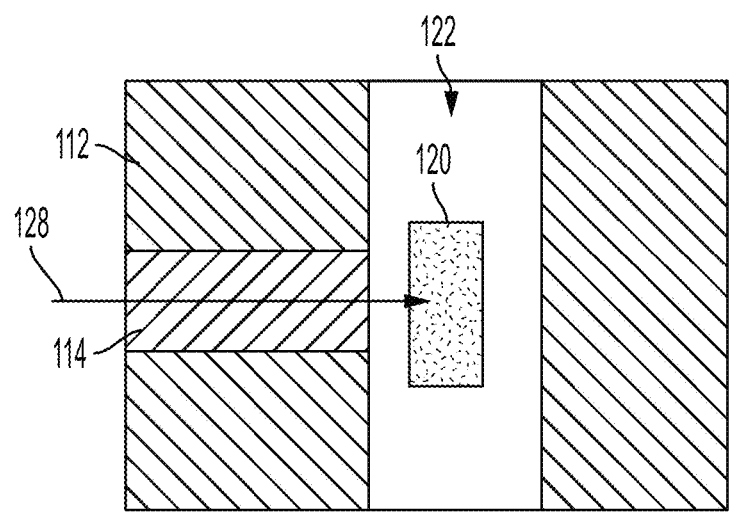

FIGS. 1A-1E depict schematic views of a waveguide structure 100, in accordance with some embodiments. FIG. 1A shows a cross-sectional view from two angles of the waveguide structure 100, with the two views demarcated by the vertical line 102 indicating a 90° corner. FIG. 1B shows an overhead view of a portion of the waveguide structure 100. FIGS. 1C-1E illustrate additional waveguide architectures 104 for guiding light with an optofluidic chip or optofluidic device.

As shown in FIG. 1A, the waveguiding layer 106 may be formed of one or more oxide layers. In some embodiments, a low-index oxide layer 108 may be disposed atop a substrate (e.g., silicon) layer 116, a high-index oxide layer 110 may be disposed atop the low-index oxide layer 108, and an additional low-index oxide layer 112 may be disposed atop the high-index layer 110. In some embodiments, a high-index oxide strip 114 may be disposed atop the high-index layer 110 such that high-index oxide strip 114 protrudes into at least a portion of the second low-index layer 112. In some embodiments, the high-index oxide strip 114 may be disposed below the high-index oxide layer 110 such that the strip 114 protrudes from the high-index oxide layer 110 and into at least a portion of the first low-index oxide layer 108. In some embodiments, a high-index oxide strip 114 is disposed both above and below high-index oxide layer 110 such that the strip protrudes into each of the low-index oxide layers 108 and 112. The three oxide layers and the at least one high-index oxide strip 114 may together form the waveguiding layer 106. As light 128 propagates primarily within the high-index oxide layer 110 and/or high-index oxide strip 114, it may be internally reflected at the interfaces with the low-index oxide layers 108 and/or 112. Thus, a ridge waveguide may be provided at high-index oxide layer 110 and/or high-index oxide strip 114, wherein the ridge waveguide core may support one or more modes of light propagating along the waveguide. For example, the ridge waveguide may comprise a core region and a cladding region for propagating light along the waveguide. In some embodiments, the low-index oxide layer 108 and the substrate layer 116 may both be replaced by a low-index substrate layer.

In some embodiments, high-index oxide strip 114 may have an index of refraction that is equal to the index of refraction of high-index oxide layer 110. In some embodiments, the indices of refraction of high-index oxide strip 114 and high-index oxide layer 110 may be similar but not identical, for example by being different from one another by an amount less than or equal to 0.00001, 0.0001, 0.001, 0.01, 0.02, or 0.05. In some embodiments, the indices of refraction of high-index oxide strip 114 and high-index oxide layer 110 may be different from one another by an amount greater than or equal to 0.00001, or 0.0001, 0.001, 0.01, 0.02, or 0.05.

In some embodiments, waveguide structure 100 may additionally comprise an aperture layer 118 located adjacent to (e.g., directly adjacent to or indirectly adjacent to) and/or coupled to the waveguiding layer 106 and disposed atop substrate layer 116. Aperture layer 118 may comprise a non-transparent metal, such as chrome, nickel, another metal, one or more anti-resonant reflecting optical waveguide (ARROW) layers, and/or another opaque material configured to block background light. In some embodiments, one or more layers (e.g., substrate layers, oxide layers, etc.) may be disposed between low-index oxide layer 108 and substrate layer 116, and aperture layer 118 may be disposed beneath the one or more layers adjacent to substrate layer 116. The aperture layer 118 may be configured to allow signal light to pass through to an aperture 120 for collection while blocking other light. In some embodiments, the aperture layer 118 may be microfabricated, such that microfabrication (e.g., including sputtering, e-beam evaporation, spin coating, and/or one or more coating techniques) may be used to form one or more features of an aperture itself. In some embodiments, one or more apertures 120 may be produced by a focused-ion beam and/or other subtractive manufacturing techniques.

In some embodiments, an aperture and/or aperture layer may be disposed within cover layer 124, for example such that an aperture may be aligned with fluidic channel 122. In some embodiments, one or more apertures 120 formed in the aperture layer 118 may be positioned near the fluid channel 122 and near a lens embedded into the substrate layer 116 (described below) to allow signal light to pass from the fluid channel 122 through the aperture layer 118 and into the lens in the substrate layer 116 for collection, while blocking background light that does not pass through the aperture 120 and is instead blocked by opaque portions of the aperture layer 118. In some embodiments, the one or more apertures 120 may be aligned with a center of fluid channel 122. In some embodiments, the one or more apertures 120 may be aligned with fluid channel 122 but not aligned with a center of fluid channel 122. In some embodiments, the one or more apertures may span an entire width of channel 122. In some embodiments, aperture 120 may span less than an entire width of channel 122. Aperture 120 may in some embodiments span greater than or equal to 5%, 10%, 25%, 40%, 50%, 60%, 75%, 90%, or 95% of a width of channel 122. Aperture 120 may in some embodiments span less than or equal to 5%, 10%, 25%, 40%, 50%, 60%, 75%, 90%, or 95% of a width of channel 122.

In some embodiments, aperture layer 118 may comprise one or more adjacent apertures, different shaped apertures, multiple apertures forming one or more patterns, and/or spectrally-dependent apertures (e.g., an aperture layer 118 may in some embodiments comprise a stack of ARROW layers). In some embodiments, one or more apertures 120 in the aperture layer 118 may be used to spatially filter excitation light, such that, for example, a beam of excitation light incident on the waveguide structure 100 may only be able to make it through one or more apertures 120 in the aperture layer 118.

In some embodiments, substrate layer 116 may comprise a transparent (e.g., silicon, PDMS, polymer, glass, etc.) or non-transparent material (e.g., chrome, nickel, another metal, one or more ARROW layers, etc.). In some embodiments, substrate layer may comprise one or more backside etchings 126. For example, in addition to the top-down etching performed to create a fluid channel and/or reservoir, bottom-up etching may be performed to create a backside etching in the non-transparent substrate layer, which may for example facilitate out-of-plane collection of light emitted from fluid channel 122, wherein the light may be collected underneath structure 100. In embodiments with one or more backside etchings 126, an additional oxide sealing layer (not illustrated) may be required. For example, the additional oxide sealing layer may be an optically transparent material with a low index of refraction. In some embodiments, the additional sealing layer may be disposed atop the substrate layer 116 prior to aperture layer 118. In some embodiments, the additional sealing layer may be disposed atop aperture layer 118 prior to an oxide layer of the waveguiding layer 106. In some embodiments, the additional oxide sealing layer may be disposed both above and below aperture layer 118 such as to optically isolate the aperture layer and prevent it from absorbing light out of the optical waveguide. Furthermore, by physically isolating the aperture layer 118, etching and/or other post-processing steps may be performed on one or more of the substrate layer 116 and/or waveguiding layer 106 without disrupting aperture layer 118 and/or aperture 120.

In some embodiments, etching into substrate layer 116, such as by etching into the side of substrate layer 116 opposite waveguiding layer 106 as shown in FIG. 1A, may be used additionally or alternatively to form structures on the waveguide structure 100 for use in physically positioning the waveguide structure 100. In some embodiments, microfabrication of the substrate 116 may be used to form one or more kinematic structures. In some embodiments, one or more structures formed via etching into the substrate layer 116 may be used to attach and/or physically interact with a physical positioning and/or alignment system. In some embodiments, one or more structures formed via etching into the substrate layer 116 may be filled with, may receive, and/or may otherwise attach to magnetic material and/or one or more magnetic components for use in kinematic applications.

In some embodiments, waveguide structure 100 with backside etching 126 may comprise a lens (not illustrated), wherein the lens may be configured to be positioned in the etching 126. The lens may be attached underneath the fluid channel 122 following bottom-up etching of substrate layer 116 for underside collection of excitation light 128 from fluid channel 122. In some embodiments, the lens may be formed from a polymeric material, dielectric material, glass, or any other suitable material.

As shown in FIG. 1A, the etching step forming the fluid channel 122 may be performed such that the high-index oxide layer 110, low-index oxide layer 108, low-index oxide layer 112, and oxide strip 114 are etched into and/or through simultaneously (e.g., as part of a single etching step). That is, rather than etching the oxide layers separately and then aligning the gaps/channels etched into them, the etching may be performed after the layers are already bonded to one another, thereby achieving automatic alignment. As shown in the example of FIG. 1A, the channel 122 may in some embodiments be formed by etching entirely through high-index oxide layer 110, low-index oxide layer 112, low-index oxide layer 108, and/or oxide strip 114 from above. In some embodiments, aperture layer 118 may be etched through from above to form aperture 120 below fluid channel 122.

In addition to etching steps that may be required to form fluid channel 122, in some embodiments, the waveguide structure may be produced by using one or more additional lithography steps to define the waveguide strip 114. In some embodiments, as there may be only two lithographic steps, it may be simple to apply this method to create more complicated waveguide structures and expose individual dies for this process (e.g. e-beam defined features). Furthermore, there may not be a need for aligning masks between fabrication steps in this workflow.

In some embodiments, waveguide structure 100 may comprise cover layer 124, which may be applied to a portion of the top of the waveguiding layer 106 to enclose the open side of the fluid channel 122. In some embodiments, cover layer 124 may extend the length of the waveguiding structure 100 atop waveguiding layer 106. In some embodiments, cover layer 124 may extend over an area located adjacent to (e.g., aligned in a vertical direction with, as shown in FIG. 1A) all or part of the ridge waveguide of structure 100. In some embodiments, cover layer 124 may extend over an area located adjacent to (e.g., aligned in a vertical direction with, as shown in FIG. 1A) all or part of oxide strip 114.

In some embodiments of any of the waveguide structures disclosed herein, one or more of the oxide layers may be placed or deposited atop another one of the oxide layers, aperture layers, oxide strips, other components of a waveguiding layer, and/or substrate layers. In some embodiments of any of the waveguide structures disclosed herein, the orientation of one or more layers and/or other components of the waveguide structures may be varied. For example, it is to be understood by one of ordinary skill in the art that in describing a first oxide layer as "atop" a second oxide layer, the first oxide layer may additionally and/or instead be disposed "beneath" the second oxide layer (e.g., the two oxide layers may be adjacent to one another). Furthermore, it is to be understood by one of ordinary skill in the art that one or more additional oxide layers may exist between a first oxide layer adjacent to a second layer (e.g, a third oxide layer may be disposed between the first and second oxide layers). In some embodiments, one or more layers may be deposited via sputter, spin-on, plasma-enhanced chemical vapor deposition (PECVD), low pressure chemical vapor deposition (LPCVD), e-beam evaporation, and/or any other deposition method.

In some embodiments of waveguide structure 100 and/or of other waveguide structures discussed herein, an index of refraction of an oxide layer (or strip, rib, etc.) may be less than or equal to 1.1, 1.2, 1.3, 1.4, 1.5, 1.6, 1.7. In some embodiments of FIG. 1A and/or of other waveguide structures discussed herein, an index of refraction of an oxide layer (or strip, rib, etc.) may be greater than or equal to 1.1, 1.2, 1.3, 1.4, 1.5, 1.6, 1.7. In some embodiments, the difference in index of refraction between an adjacent high-index oxide layer and low-index oxide layer may be less than or equal to 0.0001, 0.001, 0.01, or 0.1. In some embodiments, the difference in of index of refraction between an adjacent high-index oxide layer and low-index oxide layer may be greater than or equal to 0.0001, 0.001, 0.01, or 0.1. In some embodiments, the index of refraction of a high-index oxide layer may be greater than an index of refraction of an adjacent low-index oxide layer by an amount greater than or equal to 0.01%, 0.1%, 0.5%, 1%, 2%, 3%, 4%, 5%, or 10% the index of refraction of an adjacent low-index oxide layer. In some embodiments, the index of refraction of a high-index oxide layer may be greater than an index of refraction of an adjacent low-index oxide layer by an amount less than or equal to 0.01%, 0.1%, 0.5%, 1%, 2%, 3%, 4%, 5%, or 10% higher than the index of refraction of an adjacent low-index oxide layer.

In some embodiments, a thickness of a first oxide layer adjacent to a substrate layer 116 and/or aperture layer 118 (e.g., low-index oxide layer 108) may be less than or equal to 0.05 μm, 0.1 μm, 0.5 μm, 1 μm, 5 μm, 10 μm, or 50 μm. In some embodiments, a thickness of a first oxide layer adjacent to a substrate layer 116 and/or aperture layer 118 (e.g., low-index oxide layer 108) may be greater than or equal to 0.05 μm, 0.1 μm, 0.5 μm, 1 μm, 5 μm, 10 μm, or 50 μm. In some embodiments, an oxide layer adjacent to a substrate layer 116 and/or substrate layer 118 (e.g., low-index oxide layer 108) that is thicker may improve guiding properties of the waveguides and/or reduce the background photoluminescence from adjacent silicon/substrate material.

In some embodiments, the presence of low-index layers 108 and 112 (or alternatively ARROW layers) may create well-defined waveguides, and the cover layer 124 may enable the use of any type of material to seal the fluid channel 122, without significantly interfering with the optical properties needed for waveguiding in the solid-core waveguide 106 and, in some embodiments, in the fluid-core waveguide.

In some embodiments, a thickness of a second (middle) oxide layer (e.g., high-index oxide layer 110) disposed atop a first oxide layer may be less than or equal to 0.5 µm, 1 µm, 2.5 µm, 5 µm, 7.5 µm, 10 µm, or 15 µm. In some embodiments, a thickness of a second (middle) oxide layer (e.g., high-index oxide layer 110) may be greater than or equal to 0.5 µm, 1 µm, 2.5 µm, 5 µm, 7.5 µm, 10 µm, or 15 µm.

In some embodiments, a thickness of an oxide strip disposed within the waveguiding layer (e.g., high-index oxide strip 114) may be less than or equal to 0.5 µm, 1 µm, 2.5 µm, 5 µm, 7.5 µm, 10 µm, 15 µm, or 30 µm. In some embodiments, a thickness of an oxide strip disposed within the waveguiding layer (e.g., high-index oxide strip 114) may be greater than or equal to 0.5 µm, 1 µm, 2.5 µm, 5 µm, 7.5 µm, 10 µm, 15 µm, or 15 µm.

In some embodiments, a width of an oxide strip disposed within the waveguiding layer (e.g., high-index oxide strip 114) may be less than or equal to 0.1 µm, 0.5 µm, 1 µm, 5 µm, 10 µm, 20 µm, 25 µm, or 50 µm. In some embodiments, a width of an oxide strip disposed within the waveguiding layer (e.g., high-index oxide strip 114) may be greater than or equal to 0.1 µm, 0.5 µm, 1 µm, 5 µm, 10 µm, 20 µm, 25 µm, or 50 µm.

In some embodiments, a thickness of a third (top) oxide layer disposed atop second oxide layer 110 and/or oxide strip 114 (e.g., low-index oxide layer 112) may be less than or equal to 0.1 um, 0.5 µm, 1 µm, 2.5 µm, 5 µm, 7.5 µm, 10 µm, 15 µm, or 30 µm. In some embodiments, a thickness of a third oxide layer disposed atop a second oxide layer 110 and/or oxide strip 114 (e.g., low-index oxide layer 112) may be greater than or equal to 0.1 µm, 0.5 µm, 1 µm, 2.5 µm, 5 µm, 7.5 µm, 10 µm, 15 µm, or 30 µm.

In some embodiments, the thickness of oxide strip 114 may be less than or equal to the thickness of low-index oxide layer 112, such that oxide strip 114 extends through at least a portion of low-index layer 112 but does not exceed the thickness of low-oxide layer 112. For example, the thickness of oxide strip 114 may extend through at least 10%, 20%, 30%, 40%, 50%, 60%, 70% 80%, or 90% of low-oxide layer 112. In some embodiments, the thickness of oxide strip 114 may extend through no more than 10%, 20%, 30%, 40%, 50%, 60%, 70% 80%, or 90% of low oxide layer 112.

FIG. 1C-1E illustrates additional waveguiding architectures 104 for waveguide structure 100. Specifically, FIGS. 1C-1E show cross-sectional views illustrated only to the left of the demarcated 90° corner 102 of the waveguide structure 100 in FIG. 1A. Each of the waveguiding structures of FIGS. 1C-1E may comprise any one or more features described with respect to FIGS. 1A-1B.

FIG. 1C illustrates a buried waveguide architecture, in accordance with some embodiments. As shown, a waveguiding layer may be formed of one or more low-index oxide layers and a high-index buried oxide strip. In some embodiments, a low-index oxide layer 132 may be disposed atop a substrate layer 130. A high-index oxide strip 134 may be disposed (e.g., placed or deposited) atop the low-index layer 132. In some embodiments, the high-index oxide strip 134 may be flanked at either side by a low-index oxide layer 136, and an additional low-index oxide layer 138 may be disposed atop the high-index oxide strip 134 and/or low-index oxide layer 136. In some embodiments, low-index oxide layers 136 and 138 may be disposed at substantially the same time, thereby surrounding high-index oxide strip 134. The three oxide layers and the oxide strip 134 may together form a waveguiding layer (e.g., waveguiding layer 106 in FIG. 1A). As light (e.g., light 128 in FIG. 1A) propagates primarily through the high-index oxide strip 134, it may be internally reflected at the interfaces with the low-index oxide layers 132, 136, and/or 138. For example, the buried waveguide may comprise a core region and a cladding region provided primarily at and/or surrounding high-index oxide strip 134 for propagating light along the waveguide. The buried waveguide may support one or more modes of light (e.g., a standing mode, a transverse mode, a transverse electromagnetic mode, and/or a fundamental transverse electromagnetic mode ($TEM_{oo}$)) propagating along the waveguide. In some embodiments, the low-index oxide layer 132 and the substrate layer 130 may both be replaced by a low-index oxide substrate layer.

The thickness of one or more oxide layers 132, 136, and/or 138 may be substantially the same as oxide layers 108, 110, and/or 112 described above with respect to FIG. 1A. In some embodiments, the thickness of the high-index oxide strip 134 may be less than or equal to 0.1 µm, 0.5 µm, 1 µm, 2.5 µm, 5 µm, 7.5 µm, 10 µm, or 50 µm. In some embodiments, the thickness of the high-index oxide strip 134 may be greater than or equal to 0.1 µm, 0.5 µm, 1 µm, 2.5 µm, 5 µm, 7.5 µm, 10 µm, or 50 µm. In some embodiments, the thickness of high-index oxide strip 134 may be less than or equal to that of low-index layer 136. In some embodiments, the thickness of high-index oxide strip 134 may be greater than or equal to that of low-index layer 136.

In some embodiments, the width of high-index oxide strip 134 may be substantially the same as high-index oxide strip 114 described above with respect to FIG. 1A. In some embodiments, the width of high-index oxide strip 134 may be greater than or equal to 0.1 µm, 0.5 µm, 5 µm, 10 µm, 20 µm, 25 µm, or 50 µm. In some embodiments, the width of high-index oxide strip 134 may be less than or equal to 0.1 µm, 0.5 µm, 1 µm, 5 µm, 10 µm, 20 µm, 25 µm, or 50 µm.

FIG. 1D illustrates a strip-loaded waveguide architecture 104 in accordance with some embodiments. As shown, a waveguiding layer may comprise a low-index oxide layer 142 disposed (e.g., placed or deposited) atop a substrate layer 140. A high-index oxide layer 144 may be disposed atop the low-index oxide layer 142, and a low-index oxide strip 146 may be disposed atop the high-index layer 144. Additionally, a medium-index oxide layer 148 may be disposed atop the low-index oxide strip 146 and/or high-index oxide layer 144. The three oxide layers and the oxide strip 146 may together form a waveguiding layer (e.g., waveguiding layer 106 in FIG. 1A). As light (e.g., light 128 in FIG. 1A) propagates primarily through the high-index oxide layer 144, it may be internally reflected at the interfaces with the low and/or medium-index oxide layers 142, 148, and/or oxide strip 146. In some embodiments, the differences in refraction between the low-index oxide strip 146, high-index oxide layer 144, low-index oxide layer 142, and medium-index oxide layer 148 may be configured such that one or more modes of propagating light are confined to a region of high-index oxide layer 144 located below strip 146. Thus, a strip-loaded waveguide may comprise a core region and cladding region provided primarily at and/or surrounding high-index oxide layer 144 at a location below oxide strip 146 for propagating light along the waveguide. The strip-loaded waveguide may support one or more modes of light propagating along the waveguide. In some embodiments, the low-index oxide layer 142 and the substrate layer 140 may both be replaced by a low-index oxide substrate layer.

The thickness of one or more oxide layers 142, 144, and/or 148 may be substantially the same as oxide layers 108, 110, and/or 112 described above with respect to FIG. 1A. In some embodiments, the thickness of the low-index oxide strip 146 may be less than or equal to 0.1 µm, 0.5 µm, 1 µm, 2.5 µm, 5 µm, 7.5 µm, 10 µm, or 50 µm. In some embodiments, the thickness of the low-index oxide strip 146 may be greater than or equal to 0.1 µm, 0.5 µm, 1 µm, 2.5 µm, 5 µm, 7.5 µm, 10 µm, or 50 µm. In some embodiments, the low-index oxide strip 146 may protrude into at least a portion of medium-index layer 148. In some embodiments, the low-index oxide strip 146 extends through greater than 10%, 20%, 30%, 40%, 50%, 60%, 70%, 80%, or 90% of the thickness of the medium-index layer 148. In some embodiments, the low-index oxide strip 146 extends through less than 10%, 20%, 30%, 40%, 50%, 60%, 70%, 80%, or 90% of the thickness of the medium-index layer 148.

In some embodiments, the width of low-index oxide strip 146 may be greater than or equal to 0.1 µm, 0.5 µm, 1 µm, 5 µm, 10 µm, 20 µm, 25 µm, or 50 µm. In some embodiments, the width of low-index oxide strip 146 may be less than or equal to 0.1 µm, 0.5 µm, 1 µm, 5 µm, 10 µm, 20 µm, 25 µm, or 50 µm.

FIG. 1E illustrates a slot waveguide architecture 104 in accordance with some embodiments. As shown, a waveguiding layer may comprise a low-index oxide layer 152 disposed (e.g., placed or deposited) atop a substrate (e.g., silicon) layer 150, followed by a high-index oxide layer 154 disposed atop the low-index oxide layer 152. In some embodiments, at least two high-index oxide ribs 156 may be disposed atop the high-index oxide layer 154 and flank a slot waveguide region of a second low-index oxide layer 158 disposed atop the high-index oxide layer 154 and/or the high-index oxide ribs 156. The three oxide layers and the at least two oxide ribs 156 may together form a waveguiding layer (e.g., waveguiding layer 106 in FIG. 1A). As light (e.g., light 128 in FIG. 1A) propagates primarily through the slot waveguide region of low-index oxide layer 158 located between ribs 156, it may be internally reflected at the interfaces with ribs 156 and/or layer 154. In some embodiments, the differences in refraction between the low-index oxide layer 158, high-index oxide layer 154, and ribs 156 may be configured such that one or more modes of propagating light are confined to the slot waveguide region of low-index oxide layer 158 located between ribs 156. Thus, a slot waveguide comprising a waveguide core region and cladding region may be provided primarily at and/or surrounding a low-index oxide layer 158 at a location above oxide strip 154 and between ribs 156, wherein the slot waveguide may support one or more modes of light propagating along the waveguide. In some embodiments, the low-index oxide layer 152 and the substrate layer 150 may both be replaced by a low-index substrate layer.

The thickness of one or more oxide layers 152, 154, and/or 158 may be substantially the same as oxide layers 108, 110, and/or 112 described above with respect to FIG. 1A. In some embodiments, the thickness of each the oxide ribs 156 may be less than or equal to 0.1 µm, 0.5 µm, 1 µm, 2.5 µm, 5 µm, 7.5 µm, 10 µm, or 50 µm. In some embodiments, the thickness of each of the oxide ribs 156 may be greater than or equal to 0.1 µm, 0.5 µm, 1 µm, 2.5 µm, 5 µm, 7.5 µm, 10 µm, or 50 µm. In some embodiments, the at least two oxide ribs 156 may protrude into at least a portion of low-index oxide layer 158. In some embodiments, the pair of oxide ribs 156 extends through greater than 10%, 20%, 30%, 40%, 50%, 60%, 70%, 80%, or 90% of the thickness of the low-index layer 158. In some embodiments, the pair of oxide ribs 156 extends through less than 10%, 20%, 30%, 40%, 50%, 60%, 70%, 80%, or 90% of the thickness of the low-index layer 158.

In some embodiments, the width of a slot waveguide region of the second low-oxide layer 158 between ribs 156 may be greater than or equal to 50 nm, 100 nm, 250 nm, 500 nm, 750 nm, 1000 nm, or 1200 nm. In some embodiments, the width of a slot waveguide region of the second low-oxide layer 158 between ribs 156 may be less than or equal to 50 nm, 100 nm, 250 nm, 500 nm, 750 nm, 1000 nm, or 1200 nm.

In some embodiments, the width of any specific one of the oxide ribs 156 may be greater than or equal to 50 nm, 100 nm, 250 nm, 500 nm, 1 µm, 5 µm, 10 µm, 15 µm, or 25 µm. In some embodiments, the width of any specific one of the oxide ribs 156 may be less than or equal to 50 nm, 100 nm, 250 nm, 500 nm, 1 µm, 5 µm, 10 µm, 15 µm, or 25 µm.

Figure 2A:
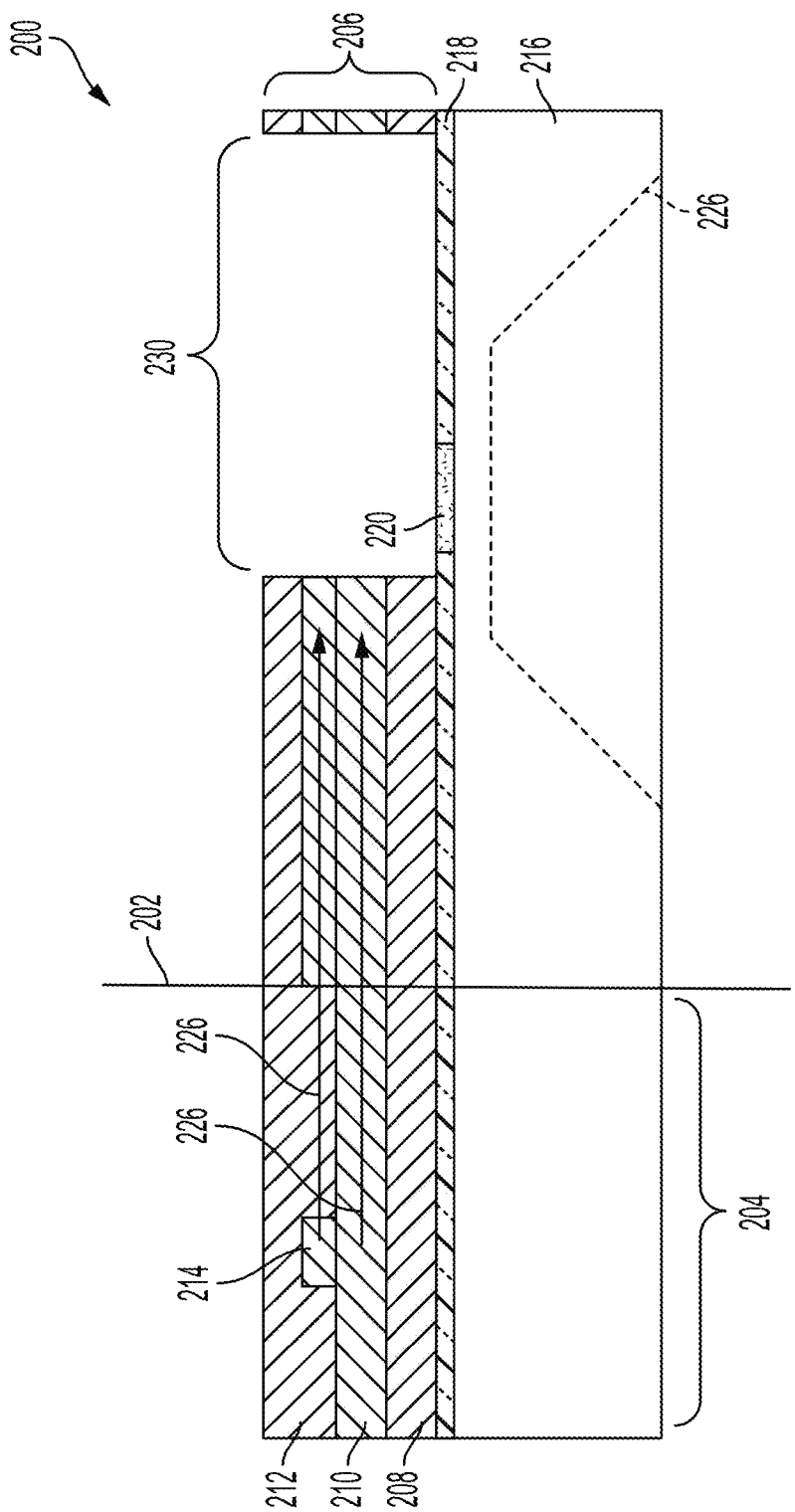
FIGS. 2A and 2B depict schematic views of a waveguide structure having a fluid reservoir, in accordance with some embodiments.
Figure 2B:
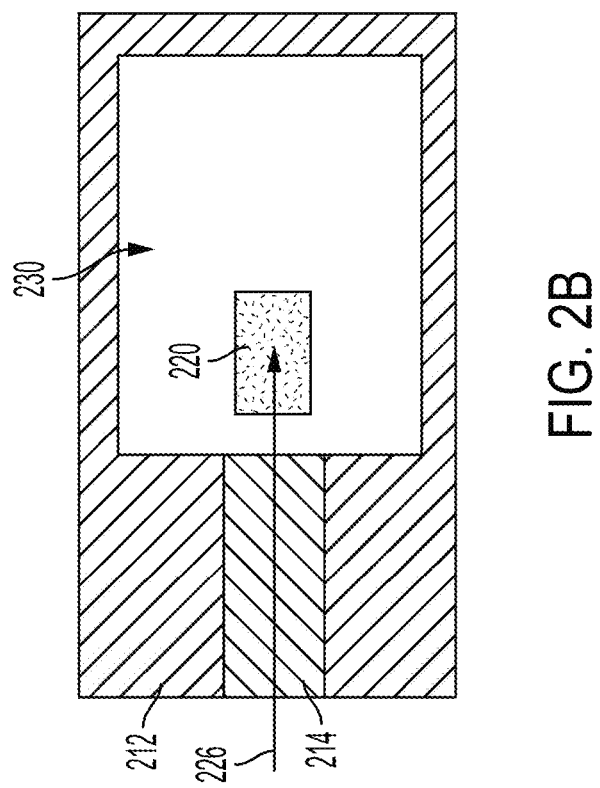

FIGS. 2A-2B depict schematic views of a waveguide structure 200, in accordance with some embodiments. FIG. 2A shows a cross-sectional view from two angles of the waveguide structure 200, with the two views demarcated by the dotted line indicating a 90° corner 202. FIG. 2B shows an overhead view of a portion of the waveguide structure 200. Waveguide structure 200 may comprise any of the features described above with respect to FIGS. 1A-1E, but may differ in that rather than intersecting the waveguiding layer with a fluid channel, the optofluidic device may comprise a free-flowing, open fluid reservoir 230. For example, the waveguide architecture 204 illustrated in FIG. 2A may optionally be substituted with any of the additional waveguide architectures 104 illustrated in FIGS. 1C-1E. For example, waveguide architecture 204 may comprise a plurality of oxide layers (e.g., oxide layers, 208, 210, 212) and an oxide strip 214 forming a waveguiding layer 206, wherein the fluid reservoir 230 may intersect at least a portion of the oxide layers and the oxide strip. Waveguiding layer 206 may comprise a waveguide for guiding light toward fluid reservoir 230, the waveguide comprising a waveguide core region, cladding region, and surrounding boundary region (e.g., walls).

In some embodiments, fluid reservoir 230 may be greater than or equal to 2, 3, 4, or 5 magnitudes larger than fluid channel 122 illustrated with respect to FIGS. 1A and 1B. In some embodiments, fluid reservoir 230 may be less than or equal to 2, 3, 4, or 5 magnitudes larger than fluid channel 122. For example, a height and/or width of a fluid reservoir may be between 100 µm and 10 mm. In some embodiments, a height and/or width of a fluid reservoir may be less than or equal to 100 µm, 500 µm, 1 mm, 5 mm, or 10 mm. In some embodiments, a height and/or width of a fluid reservoir may be greater than or equal to 100 µm, 500 µm, 1 mm, 5 mm, or 10 mm.

In some embodiments, the fluid reservoir 230 may comprise an imaging region located proximal to an aperture 220 and a non-imaging region located away from the aperture 220. In some embodiments, one or more sensors (not illustrated) may be configured to capture signal from analytes (e.g., particles) in suspension in the imaging region of the channel when the analytes are illuminated and/or excited by the light propagating through the waveguiding layers. In some embodiments, the sensor (e.g., photodetector) may be disposed on an opposite side of the aperture layer 218 from the reservoir 230. In this manner, image data from particles may only be detected when the particles are in the imaging region adjacent to aperture 220, even if the particles emit light in other locations of the fluid reservoir 230. In some embodiments, a sensor may be provided out-of-plane of a fluid reservoir 230 of waveguide structure 200. In some embodiments, a sensor may be provided separately from waveguide structure 200. In some embodiments, the sensor may be provided as a part of (i.e., physically mounted and/or integrated into) waveguide structure 200.

In some embodiments, waveguide structure 200 may comprise an agitation device, mixer, pump, stirrer, sonicator, and/or other mechanism (not illustrated) configured to create turbulence and/or flow in the fluid reservoir.

While the disclosure herein has discussed the use of certain oxide materials in the waveguiding layers of waveguide structures, the waveguiding layers of the structures disclosed herein may in some embodiments be formed (in whole or in part) from one or more alternate or additional materials, including but not limited to materials deposited using vapor deposition (e.g., oxide such as titanium dioxide deposited via plasma-enhanced chemical vapor deposition (PECVD) or low pressure chemical vapor deposition (LPCVD)), materials formed via thermal oxidation (e.g., silicon dioxide formed from thermal oxidation of silicon), spin-on glass, any one or more other materials that may be selected or configured for background reduction, and/or one or more plastics (e.g., polydimethylsiloxane (PDMS), cyclic olefin copolymer (COC), cyclic olefin polymer (COP)).

In some embodiments, following fabrication of a waveguide structure in accordance with any one or more of the fabrication techniques disclosed herein, one or more additional processes may be performed in order to further modify the fabricated chip, including but not limited to deposition, chemical modification, alteration of surface chemistry, and/or alteration of topology. In some embodiments, these one or more additional processes may be used to modify and/or enhance one or more properties of the fabricated structure, such as a hydrophobicity, smoothness, and/or reactivity of the fabricated structure.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A waveguiding structure comprising:
   a waveguiding layer comprising a first oxide layer, a second oxide layer adjacent to the first oxide layer, a third oxide layer adjacent to the second oxide layer on a side opposite from the first oxide layer, and an oxide strip adjacent to the second oxide layer and extending at least partially into the third oxide layer, wherein the first, second, and third oxide layer and oxide strip form a ridge waveguide;
   a fluid channel extending through at least a portion of the first, second, and third oxide layers and the oxide strip and intersecting the ridge waveguide such that light carried by the ridge waveguide is incident on the fluid channel; and
   a cover layer affixed to the waveguiding layer and enclosing the fluid channel.

2. The waveguiding structure of claim 1, wherein the second oxide layer and the oxide strip each have a first index of refraction.

3. The waveguiding structure of claim 2, wherein the first and third oxide layer each have a second index of refraction lower than the first index of refraction.

4. The waveguiding structure of claim 1, comprising an aperture layer adjacent to the waveguiding layer.

5. The waveguiding structure of claim 4, wherein the aperture layer comprises chrome, nickel, another metal, and/or one or more anti-resonant reflecting optical waveguide (ARROW) layers.

6. The waveguiding structure of claim 4, wherein the aperture layer is configured to allow light to pass through one or more apertures in the aperture layer, wherein the one or more apertures are aligned with the fluid channel.

7. The waveguiding structure of claim 4, comprising a substrate layer adjacent to the aperture layer and opposite the waveguiding layer.

8. The waveguiding structure of claim 7, wherein the substrate layer comprises one or more materials selected from the group: silicon, silica, and glass.

9. The waveguiding structure of claim 7, wherein the substrate layer comprises an etched region aligned with one or more apertures of the aperture layer.

10. The waveguiding structure of claim 9, wherein the substrate layer comprises an oxide sealing layer.

11. The waveguiding structure of claim 9, wherein the etched region comprises a lens element configured to collect light that escapes from the fluid channel into the etched region.

12. The waveguiding structure of claim 1, wherein the cover layer is affixed to the waveguiding layer at a location adjacent to the ridge waveguide.

13. The waveguiding structure of claim 1, wherein the cover layer comprises one or more apertures aligned with the fluid channel.

14. A waveguiding structure comprising:
   a waveguiding layer comprising a first oxide layer, a second oxide layer adjacent to the first oxide layer, a third oxide layer adjacent to the second oxide layer on a side opposite from the first oxide layer, and an oxide strip disposed in the second oxide layer, wherein the first, second, and third oxide layer and oxide strip form a buried waveguide;
   a fluid channel extending through at least a portion of the first, second, and third oxide layers and the oxide strip and intersecting the buried waveguide such that light carried by the buried waveguide is incident on the fluid channel; and a cover layer affixed to the waveguiding layer and enclosing the fluid channel.

15. The waveguiding structure of claim 14, wherein the first, second, and third oxide layer each have a first index of refraction.

16. The waveguiding structure of claim 15, wherein the oxide strip has a second index of refraction higher than the first index of refraction.

17. The waveguiding structure of claim 14, wherein the cover layer is affixed to the waveguiding layer at a location adjacent to the buried waveguide.

18. A waveguiding structure comprising:
a waveguiding layer comprising a first oxide layer, a second oxide layer adjacent to the first oxide layer, a third oxide layer adjacent to the second oxide layer on a side opposite from the first oxide layer, and an oxide strip adjacent to the second oxide layer and extending at least partially into the third oxide layer, wherein the first, second, and third oxide layer and oxide strip form a strip-loaded waveguide;
a fluid channel extending through at least a portion of the first, second, and third oxide layers and the oxide strip and intersecting the strip-loaded waveguide such that light carried by the strip-loaded waveguide is incident on the fluid channel; and
a cover layer affixed to the waveguiding layer and enclosing the fluid channel.

19. The waveguiding structure of claim 18, wherein the first oxide layer and the oxide strip each have a first index of refraction.

20. The waveguiding structure of claim 19, wherein the second oxide layer has a second index of refraction higher than the first index of refraction.

21. The waveguiding structure of claim 19, wherein the third oxide layer has a third index of refraction higher than the first index of refraction and lower than the second index of refraction.

22. The waveguiding structure of claim 18, wherein the first oxide layer has a first index of refraction.

23. The waveguiding structure of claim 22, wherein the oxide strip has a second index of refraction different from the first index of refraction.

24. The waveguiding structure of claim 18, wherein the cover layer is affixed to the waveguiding layer at a location adjacent to the strip-loaded waveguide.

25. A waveguiding structure comprising:
a waveguiding layer comprising a first oxide layer, a second oxide layer adjacent to the first oxide layer, a third oxide layer adjacent to the second oxide layer on a side opposite from the first oxide layer, and at least two oxide ribs disposed adjacent to the second oxide layer and extending at least partially into the third oxide layer, wherein the first, second, and third oxide layer and the at least two oxide ribs form a slot waveguide between the at least two oxide ribs;
a fluid channel extending through at least a portion of the first, second, and third oxide layers and the at least two oxide ribs and intersecting the slot waveguide such that light carried by the slot waveguide is incident on the fluid channel; and
a cover layer affixed to the waveguiding layer and enclosing the fluid channel.

26. The waveguiding structure of claim 25, wherein the first and third oxide layer each have a first index of refraction.

27. The waveguiding structure of claim 26, wherein the second oxide layer and the at least two oxide ribs each have a second index of refraction higher than the first index of refraction.

28. The waveguiding structure of claim 25, wherein the cover layer is affixed to the waveguiding layer at a location adjacent to the slot waveguide.

29. A waveguiding structure comprising:
a waveguiding layer comprising a waveguide;
a fluid reservoir extending through at least a portion of the waveguiding layer and intersecting the waveguide such that light carried by the waveguide is incident on the fluid reservoir, wherein the fluid reservoir comprises an imaging region and a non-imaging region; and
at least one device, configured to create turbulence for inducing flow in the fluid reservoir between the non-imaging region and the imaging region, selected from the following set: an agitation device, a stirrer, a mixer, a pump, and a sonicator.

30. The waveguiding structure of claim 29, comprising an aperture layer adjacent to the waveguiding layer, wherein the aperture layer comprises a light-blocking region disposed adjacent to the non-imaging region in the fluid reservoir and comprises one or more apertures disposed adjacent to the imaging region in the fluid reservoir.

31. The waveguiding structure of claim 29, wherein the waveguiding layer comprises a plurality of oxide layers.

32. The waveguiding structure of claim 31, wherein the fluid reservoir extends through at least a portion of one or more of the plurality of oxide layers of the waveguiding layer.

33. The waveguiding structure of claim 30, comprising a substrate layer on a side of the aperture layer opposite the waveguiding layer.

34. The waveguiding structure of claim 29, comprising a sensor configured to capture image data of particles in suspension in the imaging region of the reservoir when the particles are illuminated or excited by the light carried by the waveguide.

35. The waveguiding structure of claim 29, comprising an oxide strip disposed in the waveguiding layer, the oxide strip having a first index of refraction.

36. The waveguiding structure of claim 35, wherein at least a portion of the waveguiding layer has a second index of refraction different from the first index of refraction.

37. The waveguiding structure of claim 35, wherein the fluid reservoir extends through at least a portion of the oxide strip disposed in the waveguiding layer.

38. The waveguiding structure of claim 29, comprising at least two oxide ribs disposed in the waveguiding layer, the at least two oxide ribs having a first index of refraction.

39. The waveguiding structure of claim 38, wherein at least a portion of the waveguiding layer has a second index of refraction different from the first index of refraction.

40. The waveguiding structure of claim 38, wherein the fluid reservoir extends through at least a portion of the at least two of oxide ribs disposed in the waveguiding layer.

* * * * *